US009225830B2

(12) United States Patent
Poole

(10) Patent No.: US 9,225,830 B2
(45) Date of Patent: Dec. 29, 2015

(54) CHILD CELL PHONE APPARATUS AND METHOD

(71) Applicant: Alice Poole, Philadelphia, PA (US)

(72) Inventor: Alice Poole, Philadelphia, PA (US)

(*) Notice: Subject to any disclaimer, the term of this patent is extended or adjusted under 35 U.S.C. 154(b) by 128 days.

(21) Appl. No.: 14/140,262

(22) Filed: Dec. 24, 2013

(65) Prior Publication Data

US 2014/0187292 A1 Jul. 3, 2014

Related U.S. Application Data

(60) Provisional application No. 61/748,214, filed on Jan. 2, 2013.

(51) Int. Cl.
| | | |
|---|---|---|
| *H04W 12/08* | (2009.01) | |
| *H04M 3/44* | (2006.01) | |
| *H04M 1/2745* | (2006.01) | |
| *H04M 1/663* | (2006.01) | |
| *H04M 1/667* | (2006.01) | |
| *H04M 1/725* | (2006.01) | |

(52) U.S. Cl.
CPC .......... *H04M 3/44* (2013.01); *H04M 1/274516* (2013.01); *H04M 1/663* (2013.01); *H04M 1/667* (2013.01); *H04M 1/72588* (2013.01)

(58) Field of Classification Search
CPC .......... H04M 1/274516; H04M 1/663; H04M 1/665; H04M 1/667; H04M 1/677; H04M 1/6775; H04M 1/68; H04M 1/70; H04M 1/72588; H04M 1/72597; H04M 3/44; H04M 3/436; H04M 3/465
USPC .............. 455/564, 419, 418, 426.1, 411, 519, 455/414.3, 445, 420, 73, 575.6, 466; 368/10, 13, 281; 709/206, 207, 200; 463/31, 40, 35, 43
See application file for complete search history.

(56) References Cited

U.S. PATENT DOCUMENTS

| | | | |
|---|---|---|---|
| 6,035,217 A | 3/2000 | Kravitz | |
| 6,826,120 B1* | 11/2004 | Decker et al. | 368/10 |
| 7,869,792 B1* | 1/2011 | Zhou et al. | 455/411 |
| 8,621,023 B2* | 12/2013 | Gupta | 709/206 |
| 2004/0186895 A1* | 9/2004 | Ellis | 709/207 |
| 2005/0153661 A1* | 7/2005 | Beck | 455/73 |
| 2010/0066763 A1* | 3/2010 | MacDougall | G06F 1/1626 345/656 |
| 2011/0314111 A1* | 12/2011 | Wang et al. | 709/206 |
| 2012/0046102 A1* | 2/2012 | Tully | 463/31 |
| 2012/0295510 A1* | 11/2012 | Boeckle | 446/72 |
| 2013/0017806 A1* | 1/2013 | Sprigg | H04M 1/66 455/411 |
| 2013/0040629 A1* | 2/2013 | Sprigg | H04N 21/41407 455/419 |
| 2013/0086180 A1* | 4/2013 | Midgen et al. | 709/206 |
| 2013/0157655 A1* | 6/2013 | Smith et al. | 455/426.1 |
| 2014/0171059 A1* | 6/2014 | Parker | 455/419 |
| 2015/0079965 A1* | 3/2015 | Mullins | 455/419 |
| 2015/0079967 A1* | 3/2015 | Mullins | 455/419 |

* cited by examiner

*Primary Examiner* — Tan H Trinh
(74) *Attorney, Agent, or Firm* — IDP Patentent Services; Olav M. Underal

(57) ABSTRACT

A child cell telephone for toddlers and preschoolers, providing young children with a safe and simplified introduction to utilizing cellular technology, can comprise a processor, a memory, an input/output, a contact manager, a message manager, and a phone controller. The child cell phone offers young children the ability to make and receive calls only to and from those known to the child. The child cell phone also can display a picture of the person calling or being called, and can play back a message. Also disclosed is a method for using a child cell phone, including acts of uploading approved contacts, selecting a contact, playing a message, receiving a call, and making a call.

19 Claims, 4 Drawing Sheets

Child Cell Phone

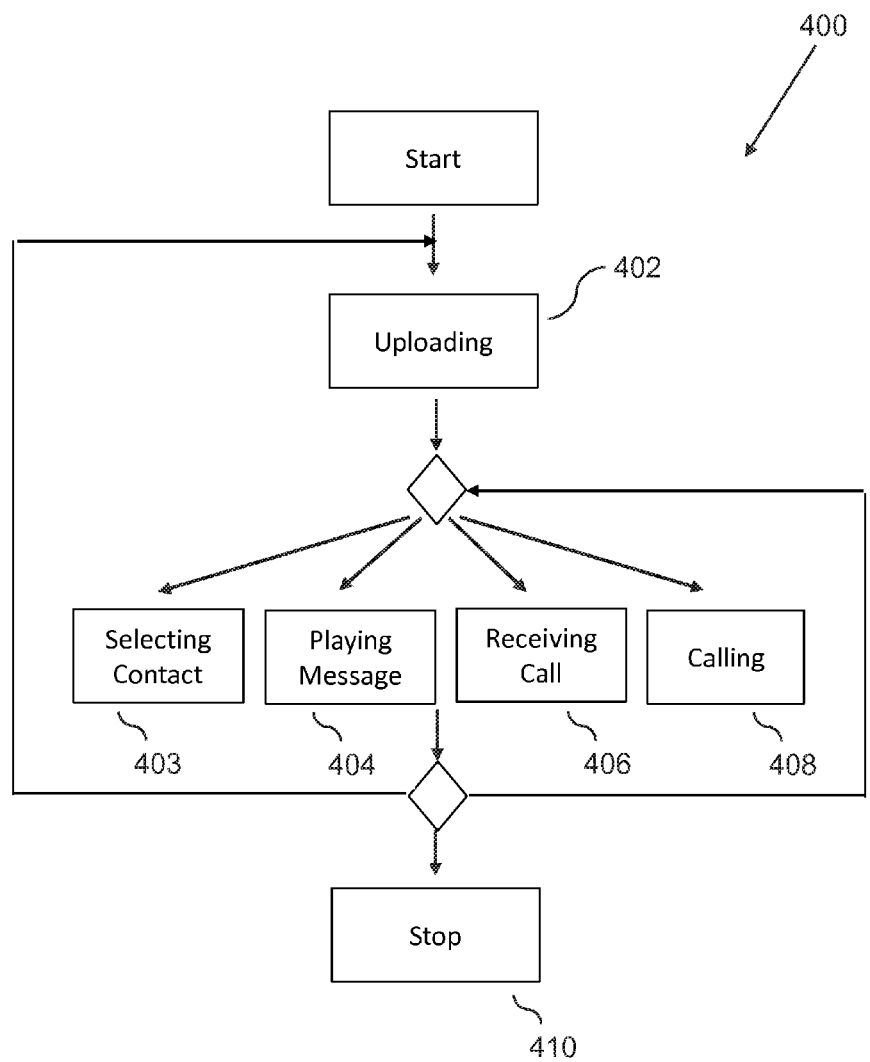

CHILD CELL PHONE APPARATUS AND METHOD

CROSS-REFERENCE TO RELATED APPLICATIONS

This application claims the benefit of U.S. Provisional Application No. 61/748,214, filed Jan. 2, 2013.

FIELD OF THE INVENTION

The present invention relates generally to the field of mobile phones and, more particularly, to mobile phones that are specially designed for use by toddlers and preschoolers. The design intent is to provide young children with a safe and simplified introduction to utilizing cellular phone technology.

BACKGROUND OF THE INVENTION

One of the fastest developing new technologies to emerge during the past thirty years is the cellular telephone. In 1994, 16 million Americans were subscribers to cellular phone services. By 2002, that number had ballooned to more than 110 million, and it is estimated that there are more than six billion mobile phones in use today. The basic concept of cellular phones began in 1947, when AT&T researchers sought ways to increase the traffic capacity and frequency of mobile communication in police car radios.

However, nonexistent technology and stringent FCC regulations postponed availability until 1982, when the FCC authorized commercial cellular use. Because of this regulation, the scientific advances of the intervening years and increased competition among communications companies put the cellular telephone on the fast track. Today's widespread use of these revolutionary devices is unsurprising, since they now offer a virtually endless array of benefits. In addition to serving as a practical means of communication while on the go, technological advances have evolved cell phones into handheld computers. Capable of keeping consumers abreast of the latest stock quotes, providing wireless Internet access, and delivering local weather updates, cellular and digital telephones have become practically indispensable to millions the world over.

However, despite this tremendous growth in use, there has continued to be a lack of cellular phone devices specifically designed and adapted for use by young children.

As such, considering the foregoing, it may be appreciated that there continues to be a need for novel and improved devices and methods for a functional child cell phone. The exemplary embodiment(s) satisfy such a need by providing a functional cellular telephone specially designed for use by toddlers and preschoolers, that is convenient and easy to use, lightweight yet durable in design, versatile in its applications, and designed to provide young children with a safe and simplified introduction to utilizing cellular technology.

SUMMARY OF THE INVENTION

The foregoing needs are met, to a great extent, by the present invention, wherein in aspects of this invention, enhancements are provided to the existing model of cell phones with inventive and novel features particularly designed for child users.

In an aspect, the child cell phone is a unique product that provides a number of benefits and advantages. For example, this communications device can allow young children from the ages of about one to four a cellular phone of their very own. Cleverly designed to make and receive calls only to those known to the child, the child cell phone can give youngsters the ability to contact parents, grandparents, other relatives, and trusted caregivers with the simple pressing of a button. As this action displays a picture of the person calling or being called, the child will know exactly who he or she is contacting without having to memorize a long phone number or navigate complicated menus to find a contact. Moreover, the picture display of an incoming caller informs parents on exactly who is calling their child's phone. As a result, parents need not worry about unsafe phone use by a child with the functional child cell phone.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 is a schematic diagram of a method for using a child cell phone, according to an embodiment of the invention.

DETAILED DESCRIPTION

Figure 1:
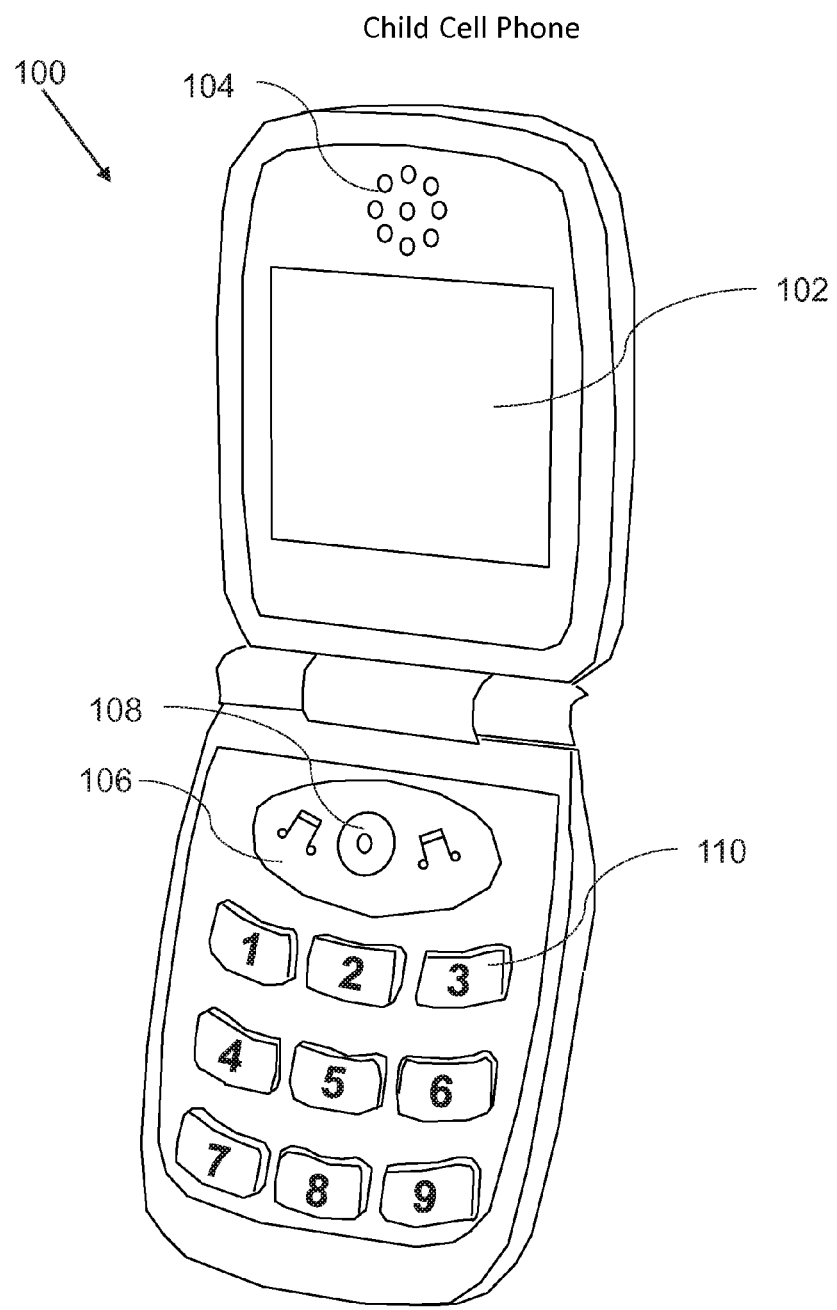
FIG. 1 is a perspective front view of an open child cell phone, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

An embodiment of the present disclosure is referred to generally in the figures and is intended to provide a functional cellular telephone that is specially designed for use by toddlers and preschoolers and thereby provide young children with a safe and simplified introduction to utilizing cellular technology. It should be understood that the exemplary embodiments may be used to educate children about many different types of cell phones, and should not be limited to any particular cell phone described herein.

In the following we describe the structure of such an embodiment in the form of a child cell phone 100 with reference to FIG. 1, in such manner that like reference numerals refer to like components throughout; a convention that we shall employ for the remainder of this specification.

In an embodiment, FIG. 1 illustrates a cell phone 100 that is specially designed for use by toddlers and preschoolers, with a limited number of features that are appropriate for use by small children.

Figure 2:
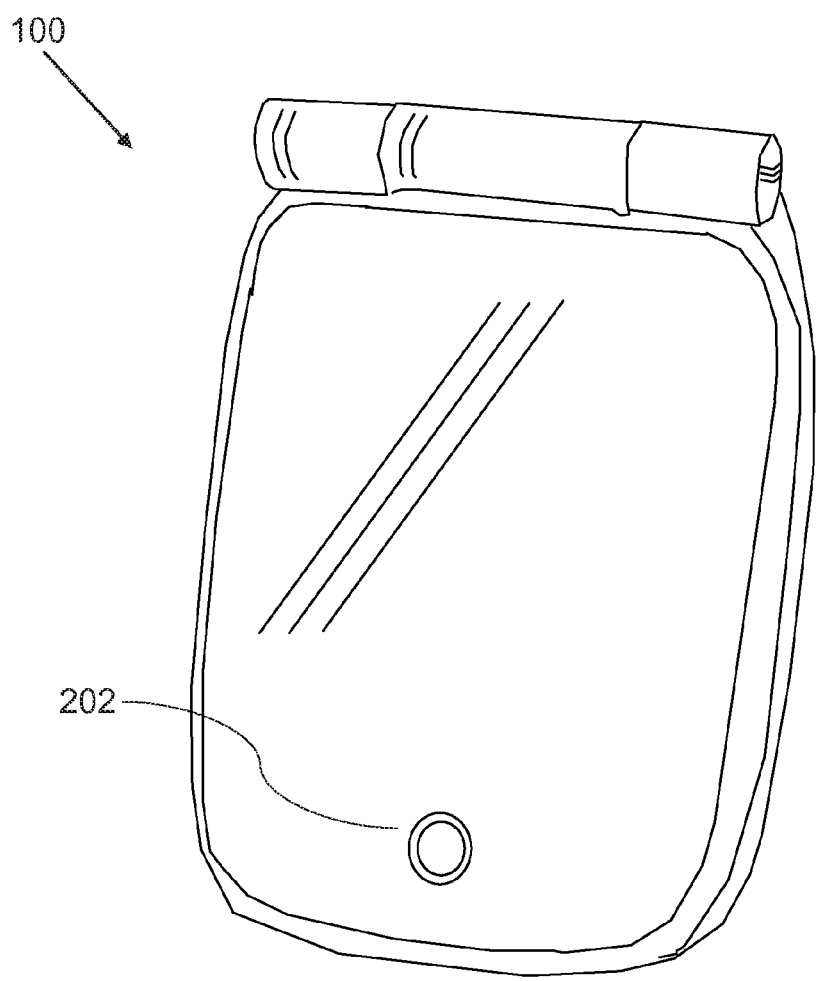
FIG. 2 is a perspective front view of a closed child cell phone, according to an embodiment of the invention.

In an embodiment, the child cell phone 100 can be designed as a rectangular or curved shape handheld phone, created in a medium size appropriate for handling by small hands. It can be designed as a flip-phone, as shown in FIGS. 1 and 2, or can be designed with other form factors common to mobile phones and smart phones.

In a related embodiment, the child cell phone 100 can include
 a. a screen 102, for displaying images;
 b. a speaker 104, for playing messages, and functioning as a phone speaker;
 c. a message button 106, for playing a message or music;
 d. a call button 108, for calling a selected person;
 e. contact buttons 110, for selecting a person In a related embodiment, the child cell phone 100 can include a power button, for switching power on and off, or it can automatically power on when any button is pressed, and automatically power off after a pre-determined period of inactivity.

Figure 3:
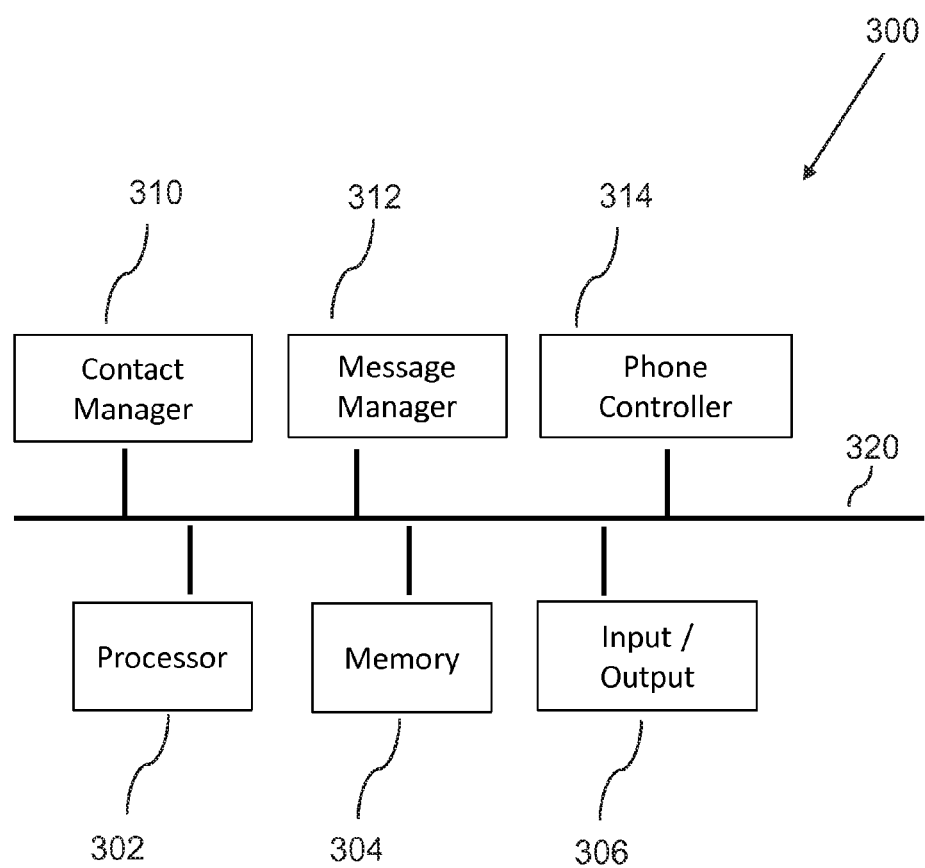
FIG. 3 is a schematic diagram of a child cell phone, according to an embodiment of the invention.

In a related embodiment the child cell phone 300, as shown in FIG. 3, can include:
 a. a processor 302;
 b. a memory 304
 c. an input/output 306;
 d. a contact manager 310;
 e. a message manager 312; and
 f. a phone controller 314; all connected via
 g. a data bus 320.

In related embodiments, the input/output 306 can include the screen 102, the speaker 104, the message button 106, the call button 108, and the contact buttons; but can also include wired or wireless connections, and other common input/output components.

In a related embodiment, the contact manager 310 of the child cell phone 300 can be configured to allow an administrative user, such as a parent or a caregiver, to program the unit by first downloading, from a connected computer, a photograph and phone number for a list of persons well known by the child. The picture can be assigned a contact identifier, which is uniquely associated with a contact button 110, and the contact identifier, contact name, picture and phone number can be stored by the contact manager 310 in the memory 302.

In a related embodiment, the phone controller 314 can be configured to allow a child user to call a person, by pressing the contact button 110 associated with the person he or she wishes to call, whereafter the contact manager can retrieve the picture of that person from the memory, and can display the contact picture on the screen, as the phone controller 316 of the child cell phone 300 dials the pre-programmed phone number.

In a related embodiment, when an incoming call is received, the contact manager 310 can register the phone number via caller ID detection, provided by the phone controller 316, and can look up the contact in the memory 302, and upon validation display the picture.

In a related embodiment, the child cell phone 300 can be configured to connect the incoming the call automatically, once a caller has been validated.

In related embodiments, a child user cannot inadvertently dial other numbers, other than those preprogrammed by the parent or caregiver, and no unrecognized numbers, associated with an incoming call, can be able to connect a call.

In a related embodiment, the child cell phone 100 can automatically receive calls from any caller that is pre-programmed in the child cell phone 100.

In a related embodiment, a caller that is pre-programmed as an approved contact can additionally enter a general security code, for example via touch-tone or voice recognition, in order for the call to pass through to the child cell phone 100.

In an embodiment, the child cell phone 100 can be programmed with messages associated with an approved contact and stored by the message manager 312 in the memory 304. Messages can for example consist of prerecorded music or songs, and spoken messages from the approved contact.

In a related embodiment, when the contact button 110 associated with a person is pressed, and thereafter the message button 106 is pressed, an audio recording, such as a happy song or comforting message, can be played by the message manager 312. Such messages and recordings can for example be "I love you!", "I'll be home soon!", "Now be a good girl today!", or even the child's favorite lullaby sung by the mother.

In a further related embodiment, a message can further include a video, whereby a video can be played by the message manager 312, as part of a message associated with a contact.

In a related embodiment, shown in FIG. 2, the child cell phone 100 can have a camera 202 for convenient capture and associating of a picture with a pre-programmed contact.

In a related embodiment, the child cell phone 100 can be pre-programmed with a distinct ring-tone associated with each pre-programmed contact.

In a related embodiment, the child cell phone 100 can have a function to enable or disable phone calls. This function can be activated either with a dedicated button, a code via the number buttons, or programmed via a wired or wireless connection with an external computer. An administrative user, including for example a parent or caregiver, can decide the appropriate age at which calls can be enabled, which in most cases would be from a minimum of age four and up.

In related embodiments, the screen 102 can be a touch screen, and some or all of the message button 106, call button 108, contact button 110, and other functions can be provided via the touch screen.

In an embodiment, as shown in FIG. 4, a method for using a child cell phone 400 can comprise:
 a. Uploading 402 a list of approved contacts, wherein each approved contact can comprise:
  i. a contact name;
  ii. a contact phone number;
  iii. a contact picture;
  iv. a message;

wherein the list of approved contacts is uploaded by an administrative user, which for example can be a parent or caregiver of a child user.

b. Selecting one of the following:
   i. Selecting a contact 403 from the list of approved contacts, wherein the child user can select an approved contact, and a contact picture of the approved contact can be displayed on the child cell phone.
   ii. Playing a message 404, wherein the child user plays the message from an approved contact;
   iii. Receiving a call 406, wherein the child user receives the call from an approved contact;
   iv. Calling 408, wherein the child user calls an approved contact; and c. Selecting one the following:
   i. Repeating the method 400 from a. Uploading 402; or
   ii. Repeating the method 400 from b. Selecting;
   iii. Terminating 410 the method.

FIGS. 3 and 4 are block diagram of devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIG. 3 depicts the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

It shall be understood that the above-mentioned components of the child cell phone 300 are to be interpreted in the most general manner.

For example, the processor 302 can include a single physical microprocessor or microcontroller, a cluster of processors, a datacenter or a cluster of datacenters, a computing cloud service, and the like.

In a further example, the memory 304 can include various forms of non-transitory storage media, including random access memory and other forms of dynamic storage, and hard disks, hard disk clusters, cloud storage services, and other forms of long-term storage. Similarly, the input/output 306 can each respectively include a plurality of well-known input/output devices, such as screens, keyboards, pointing devices, motion trackers, communication ports, and so forth.

Furthermore, it shall be understood that the child cell phone 300 can include a number of other components that are well known in the art of cell phones and hand held computer devices, and therefore shall not be further described herein. This can include internal or external antennas, radio systems, cell phone protocol handlers, and system access to common functions and hardware, such as for example via operating system layers such as Windows, Linux, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered to be fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A child cell phone that is specially designed for use by toddlers and preschoolers thereby providing young children with a safe and simplified introduction to utilizing cellular technology, comprising:
    a) a processor;
    b) a memory;
    c) an input/output component;
    d) a message manager;
    e) a contact manager; and
    f) a phone controller;
    wherein the message manager is configured to play back a message associated with a contact, wherein the message and the contact is stored in the memory;
    wherein the contact manager is configured to download a list of contacts, via the input/output, and store the list of contacts in the memory, wherein each contact comprises a contact identifier, a contact name, a picture, and a phone number;
    wherein the phone controller is configured to receive an incoming phone call, and the contact manager is configured to look up a contact from the list of contacts in the memory, based on an incoming phone number from the incoming phone call, and after validation of the contact, display a picture associated with the contact, and connect the incoming phone call;
    wherein the phone controller is further configured to request a caller to enter a security code, and after validation of the security code, connect the incoming phone call.

2. The child cell phone of claim 1, wherein the message is an audio recording.

3. The child cell phone of claim 1, wherein the message is a video recording.

4. The child cell phone of claim 1, wherein the phone controller is further configured to place an outgoing call to a contact selected from the contact list, when a user has selected a contact button associated with the user, and thereafter selected a call button.

5. The child cell phone of claim 1, wherein the phone controller is further configured to connect the incoming phone call automatically, after the contact has been validated.

6. The child cell phone of claim 1, wherein the phone controller is further configured with functions to enable phone calls, and disable phone calls, wherein an administrative user executes the functions, whereby the administrative user controls the phone calling ability for a child user.

7. The child cell phone of claim 1, wherein the contact manager is further configured to download a ring-tone associated with the contact; wherein the ring-tone is stored in the memory by the contact manager; wherein further the ring-tone is played by the phone controller upon a call from the contact.

8. A method for using a child cell phone, comprising:
    a) uploading a list of approved contacts, wherein each approved contact comprises: a contact name; a contact picture; a contact phone number; and a message; wherein an administrative user uploads the list of approved contacts to the child cell phone;
    b) laying a message, wherein a child user plays a message from an approved contact; and
    c) receiving a call, comprising requesting an approved contact to enter a security code before connecting the call, such that the child user receives the call from the approved contact.

9. The method for using a child cell phone of claim 8, further comprising selecting a contact, wherein the child user selects an approved contact from the list of approved contacts, and a contact picture of the approved contact is displayed on the child cell phone.

10. The method for using a child cell phone of claim 8, further comprising calling an approved contact, wherein the child user calls a contact phone number of the approved contact.

11. The method for using a child cell phone of claim 8, wherein the message is an audio recording.

12. The method for using a child cell phone of claim 8, wherein the message is a video recording.

13. A child cell phone that is specially designed for use by toddlers and preschoolers thereby providing young children with a safe and simplified introduction to utilizing cellular technology, comprising:
    a) a processor;
    b) a memory;
    c) an input/output component;
    d) a message manager;
    e) a contact manager; and
    f) a phone controller;
    wherein the message manager is configured to play back a message associated with a contact, wherein the message and the contact is stored in the memory;
    wherein the contact manager is configured to download a list of contacts, via the input/output, and store the list of contacts in the memory, wherein each contact comprises a contact identifier, a contact name, a picture, and a phone number;
    wherein the phone controller is configured to receive an incoming phone call, and the contact manager is configured to look up a contact from the list of contacts in the memory, based on an incoming phone number from the incoming phone call, and after validation of the contact, display a picture associated with the contact, and connect the incoming phone call;
    wherein the phone controller is further configured with functions to enable phone calls and disable phone calls, wherein an administrative user executes the functions, whereby the administrative user controls the phone calling ability for a child user, without disabling the child user's access to other functions of the child cell phone.

14. The child cell phone of claim 13, wherein the message is an audio recording.

15. The child cell phone of claim 13, wherein the message is a video recording.

16. The child cell phone of claim 13, wherein the phone controller is further configured to place an outgoing call to a contact selected from the contact list, when a user has selected a contact button associated with the user, and thereafter selected a call button.

17. The child cell phone of claim 13, wherein the phone controller is further configured to connect the incoming phone call automatically, after the contact has been validated.

18. The child cell phone of claim 13, wherein the phone controller is further configured to request a caller to enter a security code, and after validation of the security code, connect the incoming phone call.

19. The child cell phone of claim 13, wherein the contact manager is further configured to download a ring-tone associated with the contact; wherein the ring-tone is stored in the memory by the contact manager; wherein further the ring-tone is played by the phone controller upon a call from the contact.

\* \* \* \* \*